United States Patent [19]
Amano

[11] Patent Number: 5,119,389
[45] Date of Patent: Jun. 2, 1992

[54] LASER DEVICE CAPABLE OF A PLURALITY OF LASER BEAMS OF DIFFERENT LEVELS

[75] Inventor: Sho Amano, Tokyo, Japan

[73] Assignee: Hoya Corporation, Tokyo, Japan

[21] Appl. No.: 635,470

[22] Filed: Dec. 28, 1990

[30] Foreign Application Priority Data
Dec. 29, 1989 [JP] Japan ................. 1-153117[U]

[51] Int. Cl.⁵ .................... H01S 3/082; H01S 3/10
[52] U.S. Cl. ......................... 372/23; 372/22; 372/66; 372/70; 372/97
[58] Field of Search ............... 372/23, 92, 97, 70, 372/66, 21, 22, 75

[56] References Cited
U.S. PATENT DOCUMENTS
4,920,541  4/1990  Baumagartner et al. ........... 372/23
4,942,587  7/1990  Suzuki ............................... 372/75

*Primary Examiner*—James W. Davie
*Attorney, Agent, or Firm*—Ladas & Parry

[57] ABSTRACT

In a solid-state laser device comprising a laser medium which is located within a plurality of resonance optical paths and which has a plurality of medium lengths forming parts of the resonance optical paths, at least one of the medium lengths within the resonance optical paths is selected such that a third level laser beam can be oscillated while at least one of the remaining medium lengths is different from the first of the medium lengths and is selected such that a fourth level laser beam is oscillated.

9 Claims, 2 Drawing Sheets

LASER DEVICE CAPABLE OF A PLURALITY OF LASER BEAMS OF DIFFERENT LEVELS

BACKGROUND OF THE INVENTION

This invention relates to a solid-state laser device for emitting a plurality of laser beams by the use of a single laser medium. Such a plurality of laser beams will be collectively called a multi-laser beam.

A laser device of the type described is known which is capable of emitting a multi-laser beam by the use of a single laser medium. By way of example, such a laser device is disclosed in a book which is written by Alexander A. Kaminskii and which is published 1981 by Spriger-Verlag under the title of "LASER CRYSTALS", pages 111 to 113, Section 3.18 Multibeam Crystal Laser. As shown in FIG. 3.52a of the above-mentioned book, the laser device comprises the laser medium and four mirrors located around the laser medium. The laser medium is disposed in first and second resonance optical paths which pass through the laser medium with first and second medium lengths, respectively. A first pair of the mirrors is placed in the first resonance optical path with the laser medium put therebetween while a second pair of the mirrors is placed in the second resonance optical path with the laser medium put therebetween. The first pair of the mirrors forms a first resonator while the second pair of the mirrors forms a second resonator. Along the first resonance optical path, a first excitation laser beam is supplied to the laser medium from a first excitation laser beam source to excite the laser medium while a second excitation laser beam is supplied along the second resonance optical path to the laser medium from a second excitation laser source to excite the laser medium. Each of the first and the second excitation laser beams may be supplied from semiconductor laser elements.

The first resonator cooperates with the laser medium to pump the laser medium and to generate a first output laser beam which is derived from the laser medium as one of the multi-laser beam. Similarly, the second resonator cooperates with the laser medium to pump the laser medium and to generate a second output laser beam which is derived from the laser medium as another multi-laser beam. In this event, the first output laser beam has a first wavelength which is equal to about 1.06 micronmeters while the second output laser beam has a second wavelength which is equal to about 1.35 micronmeters. In the laser device, each of the first and the second laser beams is excited by the four-level system and may therefore be a fourth level laser beam. This is because each of the first and the second medium lengths is determined such that emission can be excited by the four-level system.

With this structure, no consideration is made at all about oscillation of a plurality of different level laser beams by the use of a single laser medium. Accordingly, it is impossible to generate a blue-colored laser beam which is very important for the production of three primary colors.

SUMMARY OF THE INVENTION

It is an object of this invention to provide a solid-state laser device which is capable of emitting a wide variety of laser beams which have different wavelengths.

It is another object of this invention to provide a solid-state laser device of the type described, which can emit three primary colors of light by the use of a single laser medium.

It is still another object of this invention to provide a solid-state laser device of the type described, which is feasible for emitting a blue-colored laser beam.

A solid-state laser device to which this invention is applicable is for use in emitting a plurality of laser beams. The solid-state laser device comprises a laser medium and a plurality of resonance optical paths which pass through the laser medium. The laser medium has a plurality of internal optical paths which form parts of the resonance optical paths. The internal optical paths include a first one of the internal optical paths that is selected such that a third level laser beam is generated as at least one of the laser beams and a second one of the internal optical paths that is selected such that a fourth level laser beam is generated as at least one of the remaining laser beams.

DESCRIPTION OF THE PREFERRED EMBODIMENTS

Figures 1, 3:
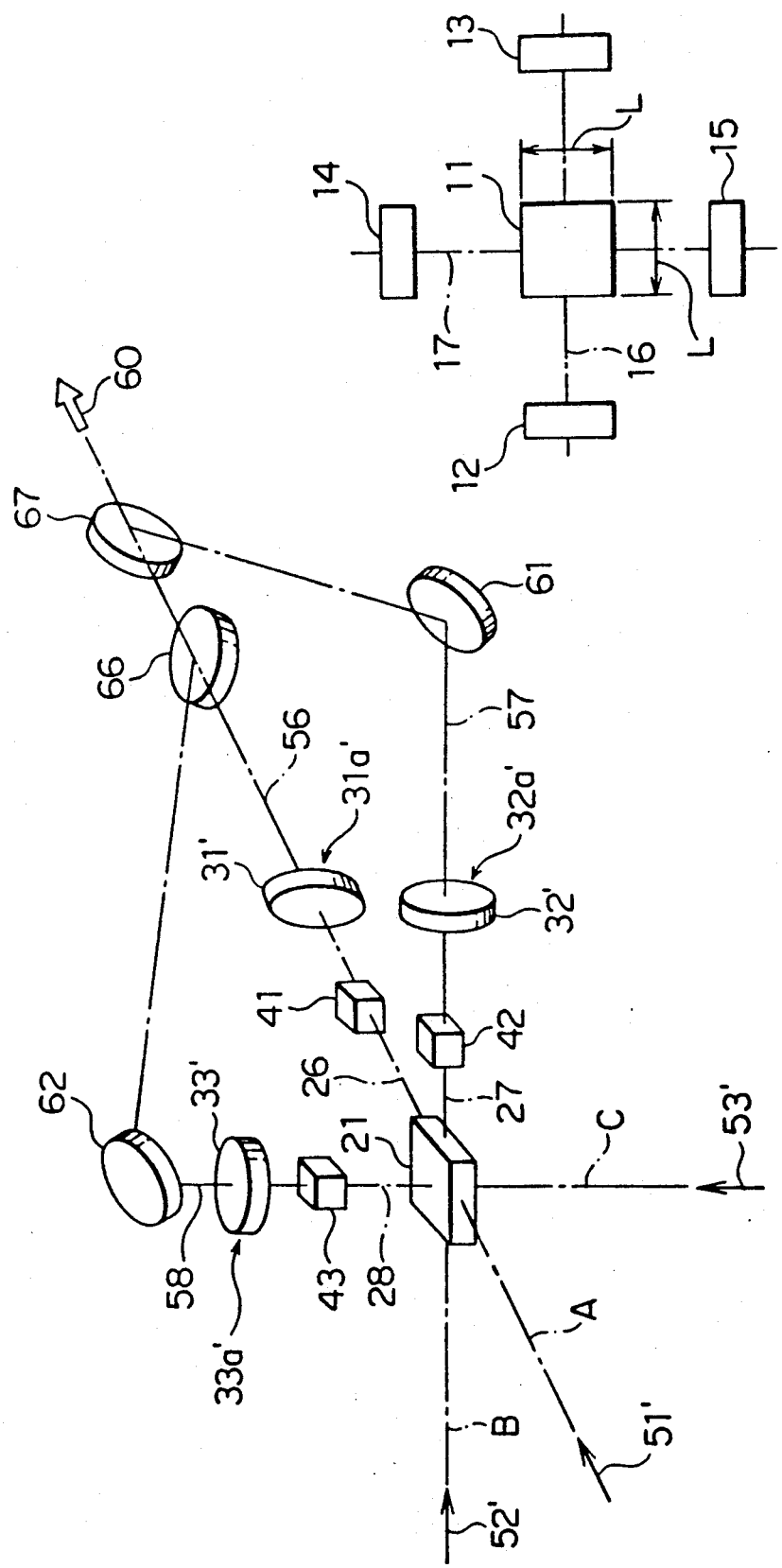
FIG. 1 is a schematic view of a conventional solid-state laser device.
FIG. 3 is a similar view of a solid-state laser device according to a second embodiment of this invention.

Referring to FIG. 1, a conventional solid-state laser device is substantially equivalent to that described previously in the Background of the Invention. The solid-state laser device comprises a laser medium 11, a first resonator composed of a pair of reflection mirrors 12 and 13, and a second resonator composed of another pair of reflection mirrors 14 and 15. As illustrated in FIG. 1, the laser medium 11 has a square shape having four sides which have an equal length L and may be formed by a neodymium-doped active material. The first and the second resonators are tuned so that first and second laser beams 16 and 17 are emitted from the laser medium 11. Practically, the first and the second laser beams 16 and 17 have first and second emission wavelengths equal to 1.06 and 1.35 micronmeters, respectively. At any rate, the first and the second laser beams are generated by exciting a fourth level by the use of a four-level scheme.

With this structure, it is impossible to emit a laser beam from a level different from the fourth level. As long as the laser beams are generated by the use of the fourth level only, it is difficult to obtain a blue-colored laser beam having a wavelength of 0.47 micronmeter, as pointed out hereinbefore.

Figure 2:
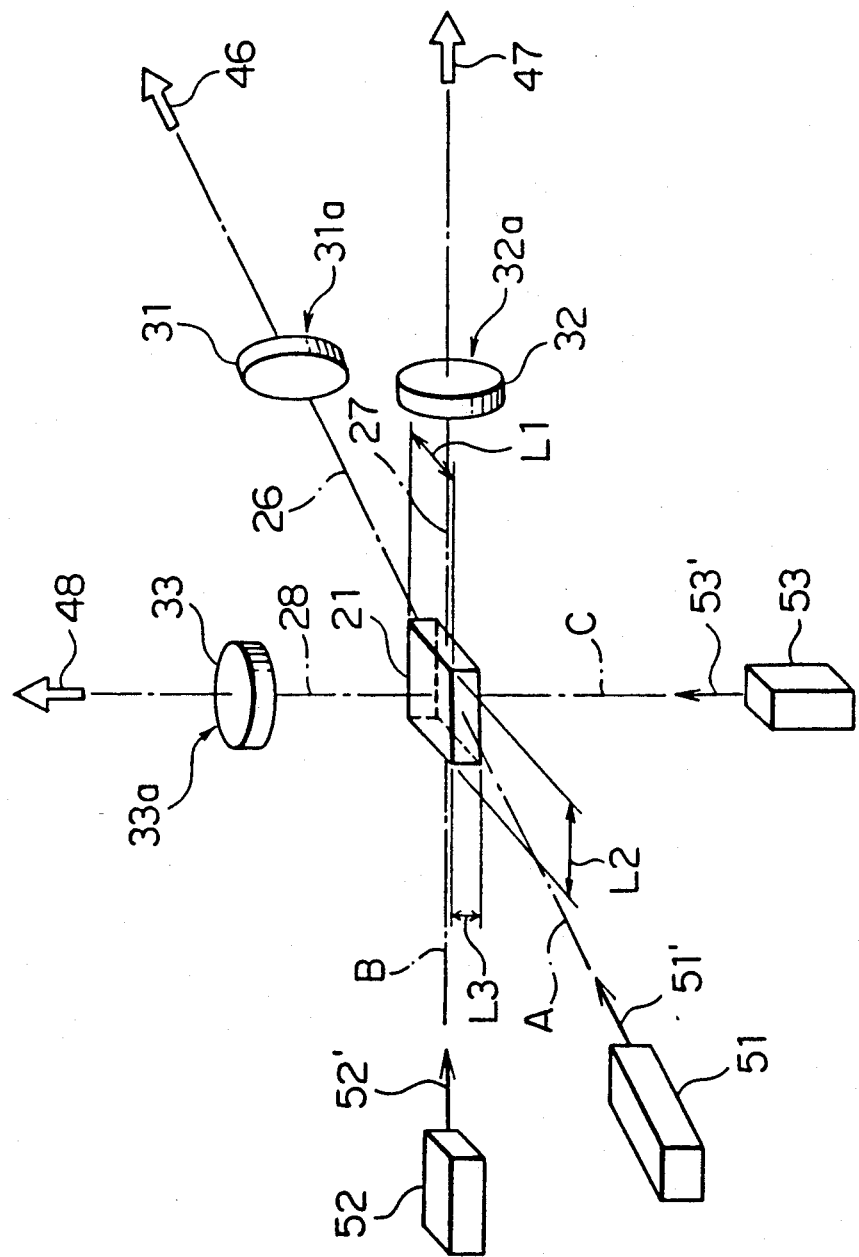
FIG. 2 is a schematic perspective view of a solid-state laser device according to a first embodiment of this invention.

Referring to FIG. 2, a solid-state laser device according to a first embodiment of this invention comprises a laser medium 21 formed as a slab-shaped rectangular parallelpiped which has upper and lower surfaces, righthand and lefthand side surfaces, and front and rear surfaces, as shown in FIG. 2. The upper and the lower surfaces may be called first and second surfaces, respectively, while the righthand and the lefthand side surfaces may be referred to as third and fourth surfaces, respectively. In this connection, the front and the rear surfaces may be called fifth and sixth surfaces, respectively. Each surface is subjected to mirror finishing and may therefore be considered as mirror finished surfaces.

The laser medium 21 may be, for example, a neodymium-doped active material, namely, a matrix doped with a neodymium ion ($Nd^{3+}$). In this event, the matrix may be, for example, a crystal, such as $Al_2O_3$, YAG ($Y_3Al_5O_{12}$), YLF ($LiYF_4$), $CaF_2$, $CaWO_4$, or a glass material, such as LHG-5 or LHG-8 manufactured and sold by Hoya Corporation.

The laser medium 21 has a size specified by a width L1, a length L2, and a thickness L3, as shown in FIG. 2. The width L1, the length L2, and the thickness L3 are defined between the front and the rear surfaces of the illustrated laser medium 21, between the righthand and the lefthand side surfaces, and between the upper and the lower surfaces, respectively. Practically, the laser medium 21 is made of YAG and the thickness L3 is 1.5 millimeters and the width L1 and the length L2 each is equal to 5 millimeters.

It is to be noted that the front surface, the lefthand side surface, and the lower surface are coated with first, second, and third reflection films, respectively. Moreover, the rear surface is coated with a first antireflection film for preventing reflection of a first laser beam 26 which has a first wavelength of 1.06 micronmeters. In other words, the first antireflection film on the rear surface is transparent to the first wavelength of 1.06 micronmeters. On the other hand, the righthand side surface is coated with a second antireflection film for preventing reflection of a second laser beam 27 which has a second wavelength of 1.32 micronmeters while the upper surface is coated with a third antireflection film for preventing reflection of a third laser beam 28 which has a third wavelength of 0.94 micronmeter.

Herein, an A-axis, a B-axis, and a C-axis are defined which are normal to the front surface, the lefthand side surface, and the lower surface, respectively, and which are orthogonal to one another in the example being illustrated. In this connection, it is readily understood that the width L1, the length L2, and the thickness L3 are measured along the A-axis, the B-axis, and the C-axis, respectively.

Further referring to FIG. 2, a first semi-transparent mirror 31 is disposed so that the semi-transparent mirror 31 intersects the A-axis and confronts the front surface of the laser medium 21. The first semi-transparent mirror 31 cooperates with the first reflection film coated on the front surface of the laser medium 21 to form a first resonator 31a. Likewise, a second semi-transparent mirror 32 is disposed along the B-axis so that the second semi-transparent mirror 32 intersects the B-axis and confronts the second reflection film coated on the lefthand side surface of the laser medium 21 so as to form a second resonator 32a between the second reflection film and the second semi-transparent mirror 32. In addition, a third semi-transparent mirror 33 is disposed along the C-axis so that the third semi-transparent mirror 33 intersects the C-axis and confronts the third reflection film coated on the lower surface to form a third resonator 33a. First, second, and third optical paths 46, 47, and 48 are formed along the A-axis, the B-axis, and the C-axis within the first, the second, and the third resonators 31a, 32a, and 33a, respectively. In this connection, first through third internal optical paths are formed within the laser medium 21 along the first through the third optical paths 46 to 48, respectively.

A first semiconductor laser device 51, a second semiconductor laser device 52, and a third semiconductor laser device 53 are disposed along the A-axis, the B-axis, and the C-axis, respectively. The first semiconductor laser device 51 emits a first excitation laser beam 51' towards the front surface of the laser medium 21 coated with the first reflection film. The first excitation laser beam 51' passes through the first reflection film into the laser medium 21 and pumps or activates the laser medium 21 through the front surface. This shows that the first reflection film is transparent to the first excitation laser beam.

The second semiconductor laser device 52 emits a second excitation laser beam 52' towards the lefthand side surface coated with the second reflection film. Like the first excitation laser beam 51', the second excitation laser beam 52' passes through the second reflection film into the laser medium 21 and pumps the laser medium 21 through the lefthand side surface.

Furthermore, the third semiconductor laser device 53 emits a third excitation laser beam 53' towards the lower surface coated with the third reflection film. As a result, the third excitation laser beam 53' passes through the lower surface into the laser medium 21 and pumps the laser medium 21 through the lower surface. Each of the first through the third excitation laser beams 51' to 53' may have the same wavelength. Practically, each of the first through the third semiconductor laser device 51 to 53 may have output power of 500 milliwatts and an oscillation wavelength of 0.807 micronmeter.

The first resonator 31a can be tuned to a fourth level laser beam which has a wavelength of 1.06 micronmeters and which may be called the first laser beam 26 as mentioned before. Specifically, the first reflection film has a reflectivity of about 100% for the first laser beam and a transmittivity greater than 97% for the first excitation laser beam which may have a wavelength of 0.807 micronmeter. Such a first reflection film can be obtained by stacking a plurality of dielectric films, as known in the art. The first semi-transparent mirror 31 has a reflectivity of 97% for the first laser beam 26 having the wavelength of 1.06 micronmeters.

The second resonator 32a is tuned to a fourth level laser beam which has a wavelength of 1.32 micronmeters and which may be referred to as the second laser beam 27. To this end, the second reflection film is formed by a plurality of dielectric films which may be named a multiple dielectric film and which have a reflectivity of 100% for the second laser beam of 1.32 micronmeters and a transmittivity greater than 90% for the second excitation laser beam of 0.807 micronmeter. The second semi-transparent mirror 32 may have a reflectivity of 98% for the second laser beam of 1.32 micronmeters.

Herein, it is to be noted that the third resonator 33a is tuned to a third level laser beam which has a wavelength of 0.94 micronmeter and which may be called the third laser beam 28. Specifically, the third reflection film has a reflectivity of about 100% for the third laser beam of the wavelength of 0.94 micronmeter and a transmittivity greater than 90% for the excitation laser beam of 0.807 micronmeter. Such a third reflection film may be formed by a plurality of dielectric films, like the first and the second reflection films. In the third resonator 33a, the third semi-transparent mirror 33 exhibits a reflectivity of 99% for the third laser beam of 0.94 micronmeter.

At any rate, the illustrated laser medium 21 is pumped from three directions through each end surface. With this structure, the width L1, the length L2, and the thickness L3 of the laser medium 21 are preferably as long as possible so as to effectively absorb the excitation laser beams generated by the first through the third semiconductor laser devices. On the other hand, they are preferably as short as possible so as to reduce a loss in the laser medium 21 itself. Thus, two contradictory requirements should be fulfilled by the laser medium 21. Taking this into consideration, optimum values of the width L1, the length L2, and the thickness L3 are determined. In this event, consideration should be given to the fact that self-absorption in the laser medium 21 rarely takes place in connection with the fourth level laser beams, such as the first and the second laser beams of 1.32 micronmeters and 1.06 micronmeters, while the self-absorption in the laser medium 21 seriously takes place in connection with the third level laser beam, such as the third laser beam having the wavelength of 0.94 micronmeter.

It has been found that an optimum length of the laser medium for the third level laser beam is less than an optimum length of the laser medium for the fourth level laser beam. Accordingly, both the third and the fourth level laser beams can not be emitted from the laser medium which has a common length.

Taking the above into consideration, the illustrated laser medium 21 has the width L1 and the length L2 each of which is equal to 5 millimeters so as to oscillate the fourth level laser beams and the thickness L3 equal to 1.5 millimeters so as to oscillate the third level laser beam. Thus, the third and the fourth level laser beams can be oscillated by the use of a common laser medium 21 by making the thickness L3 differ from the width L1 and the length L2.

As readily understood from the above, it is possible to emit the first through the third laser beams 26 to 28 from the common laser medium 21 along the A-axis, the B-axis, and the C-axis which are orthogonal to one another. Practically, it has been confirmed that the first through the third laser beams 26 to 28 have the wavelengths of 1.06, 1.32, and 0.94 micronmeters and output power between 100 and 150 milliwatts and are simultaneously generated in the form of continuous waves. In the example being illustrated, the first through the third laser beams 26 to 28 are generated as first through third output laser beams, respectively.

Referring to FIG. 3, a solid-state laser device according to a second embodiment of this invention comprises similar parts designated by like reference numerals. In the illustrated example, the first through the third laser beams 26 to 28 are emitted from the laser medium 21 along the A-axis, the B-axis, and the C-axis, respectively, and therefore have the first through the third wavelengths of 1.06, 1.32, and 0.94 micronmeters, respectively. First through third resonators depicted at 31a', 32a', and 33a' are disposed so that they intersect the A-axis, and B-axis and the C-axis, like in FIG. 2. The first through the third resonators 31a' to 33a' are somewhat different from those illustrated in FIG. 2, although the first through the third reflection films deposited on the laser medium 21 are the same as those illustrated in FIG. 2. In addition, second harmonic wave converters 41, 42, and 43 are inserted within the first through the third resonators 31a' to 33a' to divide the wavelengths of the first through the third laser beams in half and to produce second harmonic wave beams 56, 57, and 58 of the first through the third laser beams, respectively. In this connection, the second harmonic wave beams 56 to 58 of the first through the third laser beams have wavelengths equal to 0.53, 0.66, and 0.47 micronmeters, respectively. To this end, the second harmonic wave converters 41, 42, and 43 are constructed in correspondence to the wavelengths of the second harmonic wave beams, as will be described later.

More specifically, the first resonator 31a' disposed along the A-axis comprises a first semi-transparent mirror 31' which exhibits a reflectivity of about 100% for the first wavelength of 1.06 micronmeters and a transmittivity of about 90% for the wavelength of 0.53 micronmeter. The second resonator 32a' disposed along the B-axis comprises a second semi-transparent mirror 32' which exhibits a reflectivity of about 100% for the second wavelength of 1.32 micronmeters and a transmittivity of about 90% for the wavelength of 0.66 micronmeter. Likewise, the third resonator 33a' disposed along the C-axis comprises a third semi-transparent mirror which exhibits a reflectivity of about 100% for the wavelength of 0.94 micronmeter and a transmittivity of about 90% for the wavelength of 0.47 micronmeter. Such semi-transparent mirrors may be readily formed by depositing a plurality of dielectric films by the use of a known technique.

The second harmonic wave converter 41 between the laser medium 21 and the first semi-transparent mirror 31' is formed by a crystal of KTP ($KTiOPO_4$) having a length of 5 millimeters along the A-axis while the second harmonic wave converter 42 between the laser medium 21 and the second semi-transparent mirror 32' is formed by another crystal of KTP having a length of 3 millimeters along the B-axis. In addition, the third harmonic wave converter 43 is formed by a crystal of $KNbO_3$ having a length of 4 millimeters along the C-axis.

With this structure, the first through the third laser beams which will be called primary laser beams are confirmed within the first through the third resonators 31a' to 33a' from which the second harmonic wave beams, such as 56 to 58, are derived. As a result, the first semi-transparent mirror 31a' passes through the second harmonic wave beam 56 of 0.53 micronmeter which is a green-colored laser beam while the second semi-transparent mirror 32a' passes through the second harmonic wave beam 57 of 0.66 micronmeter which is a red-colored laser beam. Likewise, the third semi-transparent mirror 33a' passes through the second harmonic wave beam 58 of 0.47 micronmeter which is a blue-colored laser beam. Such green-, red-, and blue-colored laser beams 56 to 58 are concurrently generated with output power between 10 and 50 milliwatts and may be called first through third output laser beams. At any rate, three primary colored laser beams are obtained by the use of the single laser medium 21.

The three primary colored-laser beams are combined together into a white-colored or external laser beam 60 by the use of first and second reflective mirrors 61 and 62 and first and second combination mirrors 66 and 67. In this event, the first reflective mirror 61 which is located in front of the second semi-transparent mirror 32' serves to totally reflect the second harmonic wave beam of the wavelength of 0.66 micronmeter in the direction of the second combination mirror 67 while the second reflective mirror 62 which is located upwards of the third semi-transparent mirror 33' serves to totally reflect the second harmonic wave beams of the wavelength of 0.47 micronmeter into the first combination mirror 66. In this connection, the first reflective mirror 61 may reflect about 100% of this red-colored laser beam of 0.66 micronmeter while the second reflective mirror 62 may reflect about 100% of the blue-colored laser beam of 0.47 micronmeter.

The first combination mirror 66 which intersects the A-axis in front of the first semi-transparent mirror 31' serves to reflect the blue-colored beam 0.47 micronmeter and to allow the green-colored laser beam of 0.53 micronmeter to pass therethrough. On the other hand, the second combination mirror 67 which is positioned at the rear of the first combination mirror 66 serves to reflect the red-colored laser beam of 0.66 micronmeter in the direction of the second combination mirror 67 and to pass through both the laser beams which have the wavelengths of 0.53 and 0.47 micronmeters.

With this structure, the blue-colored laser beam is reflected by the second reflective mirror 62 and further reflected along the A-axis by the first combination mirror 66 which passes through the green-colored laser beam, as mentioned before. As a result, the blue-colored laser beam is combined with the green-colored laser beam by the first combination mirror 66 into a combined laser beam. The combined laser beam is sent to the second combination mirror 67 which is given the red-colored laser beam reflected by the first reflective mirror 61. Inasmuch as the second combination mirror 67 passes the combined laser beam therethrough and reflects the red-colored laser beam, the combined laser beam and the red-colored laser beam are combined together into the white-colored laser beam 68 by the second combination mirror 67.

In the example being illustrated, it is possible to independently control output levels or intensities of the red-, the green-, and the blue-colored laser beams by adjusting output levels of the first through the third excitation laser beams. This means that it is possible to attain each color over the entire visible range. Accordingly, the illustrated laser device is operable as a tunable light source in the visible range.

While this invention has thus far been described in conjunction with a few embodiments thereof, it will readily be possible for those skilled in the art to put this invention into practice in various other manners. For example, the laser medium 21 may be formed by a glass material or other materials except YAG. In this case, optical lengths in the laser medium may be identical with those illustrated in the embodiments. The laser activators doped may be rare earth elements, such as erbium (Er), proseodymium (Pr), holmium (Ho), thulium (Tm). The laser medium 21 need not always be a slab-shaped rectangular parallelpiped but a polyhedron which may be, for example, a hexagonal prism, an octagonal prism, or the like. In this event, axes, such as the A-, the B-, and the C-axes, may not be orthogonal to one another. When such a polyhedron is used as the laser medium, first through N-th resonance optical paths may be formed through the laser medium which provides first through N-th internal optical paths, respectively, when N is an integer greater than three. In this connection, first through N-th resonators should be prepared together with first through N-th excitation sources, such as semiconductor laser devices. Each of the second harmonic wave converters may be formed by a crystal of $LiNbO_3$, BNN ($Ba_2NaNb_5O_{15}$), mNA (meta-Nitro-Aniline), MNA (2 Metyl-4 Nitro-Aniline), or KDP.

What is claimed is:

1. In a solid-state laser device operable in response to first through N-th excitation beams to generate first through N-th output laser beams along first through N-th resonance optical paths, where N is representative of an integer which is not less than two, said solid-state laser device comprising a laser medium having first through N-th internal optical paths which form parts of the first through the N-th resonance optical paths, respectively, the improvement wherein the first through the N-th internal optical paths include at least one of the first through the N-th internal optical paths having a wavelength such that a third level laser beam is emitted through said at least one of the first through the N-th internal optical paths and at least one of the remaining internal optical paths having another wavelength such that a fourth level laser beam is emitted through at least one of the remaining internal optical paths:

said device further comprising:
first through N-th resonator means defining said first through N-th optical paths and supplied with the first through the N-th excitation beams for pumping said laser medium to generate the first througn the N-th output laser beams along said first through said N-th resonance optical paths, respectively, said first through said N-th output laser beams including the third and the fourth level laser beams.

2. A solid-state laser device as claimed in claim 1, N being equal to three, wherein said laser medium has a rectangular parallelpiped configuration defined by width, length, and thickness which determine the first, the second, and the third internal optical paths, respectively, each of said width and said wavelength providing the length for the fourth level laser beam while the thickness provides the wavelength for the third level laser beam.

3. A solid-state laser device as claimed in claim 2, wherein said first resonator means comprises:
a first reflection film in contact with said laser medium for allowing said first excitation beam to pass therethrough and to reflect the first output laser beam;
a first semi-transparent mirror for partially transmitting the first output laser beam;
said second resonator means comprising:
a second reflection film in contact with said laser medium for allowing said second excitation beam to pass therethrough and to reflect the second output laser beam;
a second semi-transparent mirror for partially transmitting the second output laser beam;
said third resonator means comprising:
a third reflection film in contact with said laser medium for allowing said third excitation beam to pass therethrough and to reflect the third output laser beam.

4. A solid-state laser device as claimed in claim 3, further comprising:
combining means responsive to the first through the third output laser beams for combining the first through the third output laser beams into an external laser beam.

5. A solid-state laser device as claimed in claim 3, further comprising:
first wavelength converting means between the laser medium and the first semi-transparent mirror for converting the first output laser beam into a first converted laser beam having one half of the wavelength of the first output laser beam;
second wavelength converting means between the laser medium and the second semi-transparent mirror for converting the second output laser beam into a second converted laser beam having one half of the wavelength of the second output laser beam; and third wavelength converting means between the laser medium and the third semi-transparent mirror for converting the third output laser beam into a third converted laser beam having one half of the wavelength of the third output laser beam.

6. A solid-state laser device as claimed in claim 5, further comprising:

combining means responsive to the first through the third converted laser beams for combining the first through the third converted laser beams into an external laser beam.

7. A solid-state laser device for generating a plurality of output laser beams along respective resonance optical paths, said solid-state laser device comprising a laser medium which has a predetermined configuration to define a plurality of internal optical paths along said resonance optical paths, first means for defining a first one of said resonance optical paths with a first predetermined wavelength to generate a third level laser beam as one of said output laser beams, and second means for defining a second one of said resonance optical paths with a second predetermined wavelength different from said first predetermined wavelength to generate a fourth level laser beam as one of the remaining output laser beams.

8. A solid-state laser device as claimed in claim 7 wherein said first means comprises a semi-transparent mirror on said one resonance optical path and film means on said laser medium, said second means comprising a second semi-transparent mirror on the second resonance optical path and second film means on said laser medium.

9. A solid-state laser device as claimed in claim 8 further comprising a resonating means on each optical path for producing an excitation laser beam along said path, each resonating means being so located that the laser medium is disposed between the respective resonating means and an associated one of said semi-transparent mirrors.

* * * * *